United States Patent
Berlinghof

(10) Patent No.: US 6,543,917 B1
(45) Date of Patent: Apr. 8, 2003

(54) VEHICLE POSITION INDICATING DEVICE

(75) Inventor: Hans Berlinghof, Giengen (DE)

(73) Assignee: Peter Till, Hout Bay (ZA)

( * ) Notice: Subject to any disclaimer, the term of this patent is extended or adjusted under 35 U.S.C. 154(b) by 0 days.

(21) Appl. No.: 09/716,805

(22) Filed: Nov. 20, 2000

(51) Int. Cl.$^7$ .............. B60Q 1/26; B60Q 1/22; B60Q 1/24
(52) U.S. Cl. .............. 362/485; 362/496; 362/487; 362/540; 340/932.2
(58) Field of Search ............... 362/487, 470, 362/477, 486, 485, 496, 505, 540, 543; 340/468, 471, 472, 932.1, 932.2

(56) References Cited

U.S. PATENT DOCUMENTS

| | | | | |
|---|---|---|---|---|
| 1,577,937 A | * | 3/1926 | Slusser | 362/505 |
| 2,193,063 A | * | 3/1940 | Detteiler | 362/496 |
| 3,088,022 A | * | 4/1963 | Schmidt | 362/505 |
| 3,457,397 A | * | 7/1969 | Tindall | 362/505 |
| 5,209,559 A | * | 5/1993 | Ruppel | 362/374 |
| 5,276,594 A | * | 1/1994 | Burkett et al. | 362/505 |
| 5,428,512 A | * | 6/1995 | Mouzas | 362/496 |
| 5,430,625 A | * | 7/1995 | Abarr et al. | 362/293 |
| 5,682,138 A | * | 10/1997 | Powell et al. | 340/475 |
| 6,422,728 B1 | * | 7/2002 | Riggin | 362/540 |

* cited by examiner

*Primary Examiner*—Thomas M. Sember
(74) *Attorney, Agent, or Firm*—Skinner and Associates

(57) ABSTRACT

A position indicating device (10) that can be mounted to a truck (12), comprises an electric lamp (18) and an adjustable mounting arrangement (20) for mounting the lamp to a rear end (17) of the truck. The lamp (18) is connectable to the truck's battery and has a convergent lens for emitting a focussed beam of light when the lamp is illuminated. A position indicating device (10) is mounted to the rear end (17) of the truck near opposite corners of the truck defined between the rear end and sides thereof. The position of each lamp is adjusted so as to produce a beam (43) of light that is directed downwardly onto a ground surface (42) thereby to form a spot (44) of light on the ground. The spots of light, being spaced from the truck, can be observed by the driver of the truck via the truck's rear view mirrors(48), thereby enabling the driver to judge the proximity of the spots of light and hence the truck, to the boundary of a confined area in which the truck is to be manoeuvred.

2 Claims, 4 Drawing Sheets

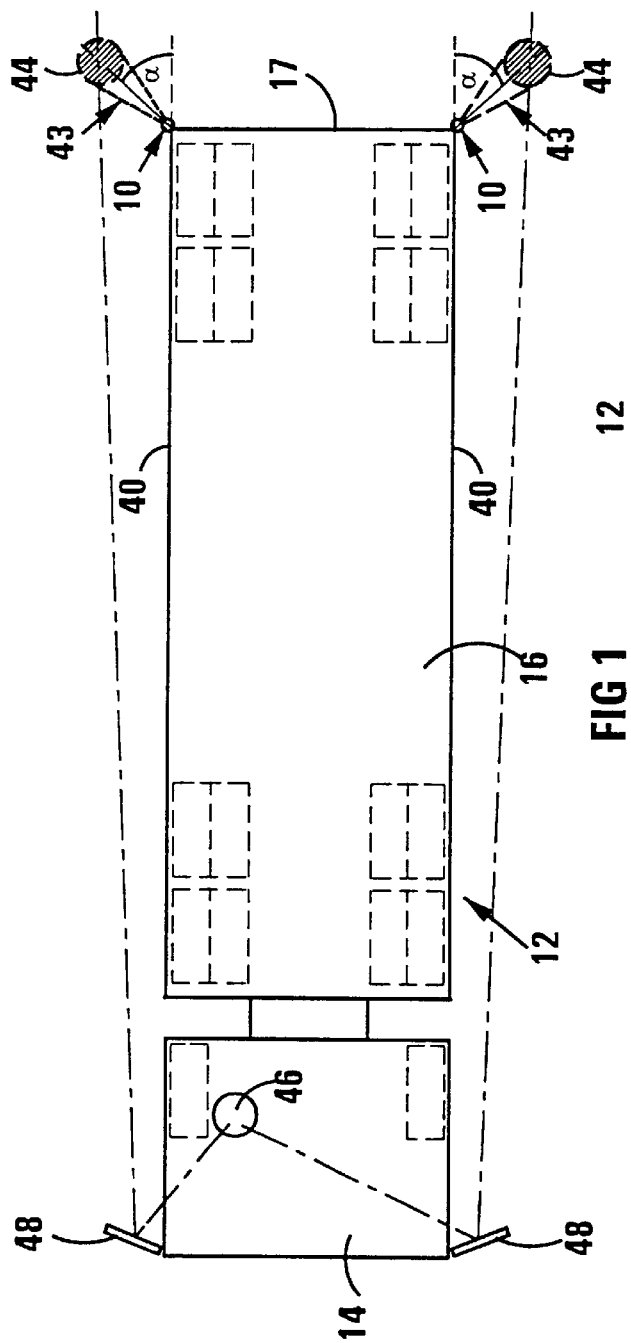
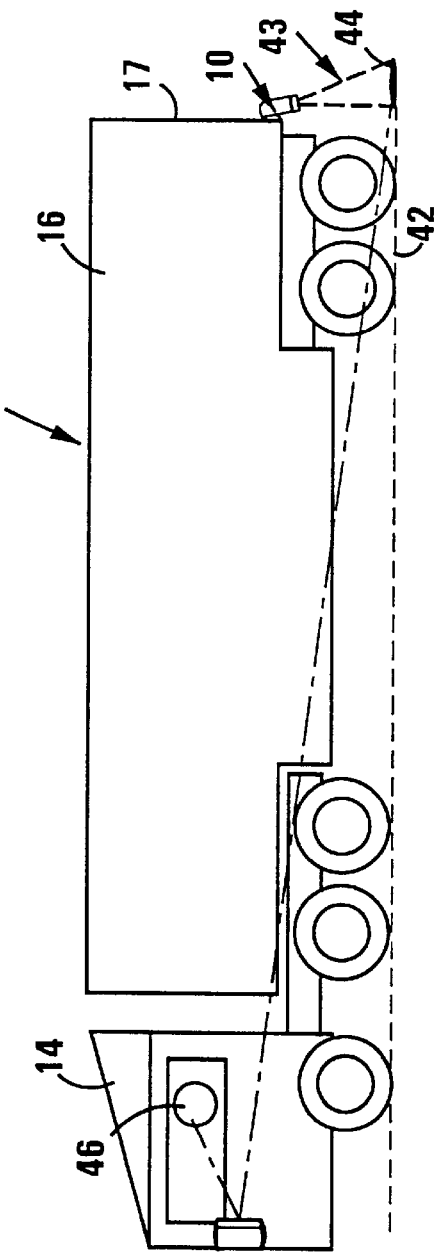
FIG 1
FIG 2

VEHICLE POSITION INDICATING DEVICE

FIELD OF INVENTION

THIS INVENTION relates to a vehicle position indicating device.

It relates particularly to a vehicle position indicating device for indicating the position of a vehicle. It relates also to a vehicle incorporating the device and to a method of indicating the position of a vehicle, to the driver of the vehicle.

BACKGROUND OF INVENTION

The positioning of vehicles relative to surrounding objects can be problematic. This is particularly a problem when manoeuvring vehicles in confined spaces. In the case of large trucks, for example, the driver is often assisted by another person in guiding the truck into a parking bay, to a loading platform, etc. In order to further assist with manoeuvring of such trucks, many trucks are fitted at the rear ends thereof with distance indicating sensors using, for example, ultrasonics, that are operable to generate output signals that provide the driver with an indication of the distance of the rear end of the truck from objects in the vicinity of the truck. This serves as a guide to manoeuvring the truck, for example, while reversing the truck. Such devices are generally expensive and can only provide an indication of the position of the truck relative to other relatively large objects. Thus, the distance indicating sensors referred to above require the presence of other large objects, barriers etc., to indicate to the driver of the truck, the position of the truck relative to such objects, barriers etc. Besides the high expense of such sensors, this is a shortcoming.

SUMMARY OF THE INVENTION

According to a first aspect of the invention there is provided a vehicle position indicating device that can be mounted to a vehicle, the vehicle position indicating device comprising an electric lamp that is operable to emit a focused beam of light when the lamp is illuminated; and mounting means for mounting the lamp to a side of the vehicle in an arrangement wherein the beam of light produced by the electric lamp is directed downwardly onto a surrounding substrate surface, in use, thereby to form a spot of light on the substrate surface at a predetermined distance from the side of the vehicle, that can be observed by a driver of the vehicle, to allow the driver to judge the proximity of the spot of light and hence of the vehicle to the boundary of a confined area when manoeuvring the vehicle in the confined area.

The mounting means may be operable to permit adjustment of the position of the electric lamp and thereby the position of the spot of light produced by the lamp on a substrate surface, in use, relative to the vehicle.

The mounting means may be operable to permit adjustment of the electric lamp for positioning the spot of light a predetermined distance from the vehicle which provides a predetermined safety clearance between the vehicle and the boundary of the confined space.

According to a second aspect of the invention there is provided a vehicle including a vehicle position indicating device, the vehicle position indicating device comprising an electric lamp that is operable to emit a focused beam of light when the lamp is illuminated; and mounting means for mounting the lamp to a side of the vehicle in an arrangement wherein the beam of light produced by the electric lamp is directed downwardly onto a surrounding substrate, in use, thereby to form a spot of light on the substrate surface at a predetermined distance from the side of the vehicle, that can be observed by a driver of the vehicle, to allow the driver to judge the proximity of the spot of light and hence of the vehicle to the boundary of a confined area when manoeuvring the vehicle in the confined area.

The mounting means may be operable to permit adjustment of the position of the electric lamp and thereby the position of the spot of light produced by the lamp on a substrate surface, relative to the vehicle.

The mounting means may be operable to permit adjustment of the electric lamp for positioning the spot of light a predetermined distance from the vehicle, which demarcates predetermined safety clearance between the vehicle and the boundary of the confined space.

According to a third aspect of the invention there is provided a method of indicating the position of a vehicle to the driver of the vehicle, the method including the steps of:

emitting a focused beam of light downwardly from a side of the vehicle, onto a surrounding substrate surface thereby to form a spot of light on the substrate surface a predetermined distance from the side of the vehicle; and the driver of the vehicle observing the spot of light when manoeuvring the vehicle in a confined area, thereby to judge the proximity of the spot of light and hence of the vehicle, to the boundary of the confined area.

The method may include adjusting the beam of light so as to position the spot of light a predetermined distance from the vehicle, thereby demarcating a predetermined safety clearance between the vehicle and the boundary of the confined area.

BRIEF DESCRIPTION OF THE DRAWINGS

FIG. 1 shows a schematic top plan view of a vehicle having a position indicating device in accordance with the invention, mounted thereto; and FIG. 2 shows a schematic side view of the vehicle of FIG. 1;

DESCRIPTION OF THE PREFERRED EMBODIMENTS

Figure 3:
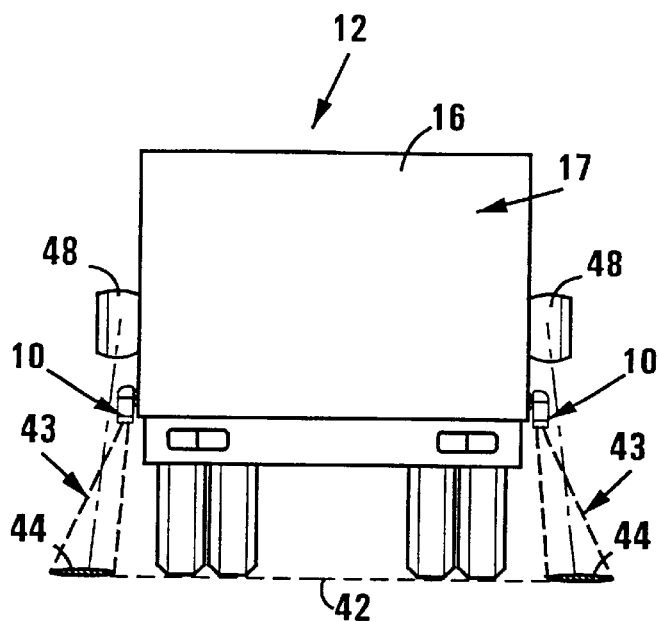
FIG. 3 shows a schematic rear end view of the vehicle of FIG. 1.
Figure 3A:
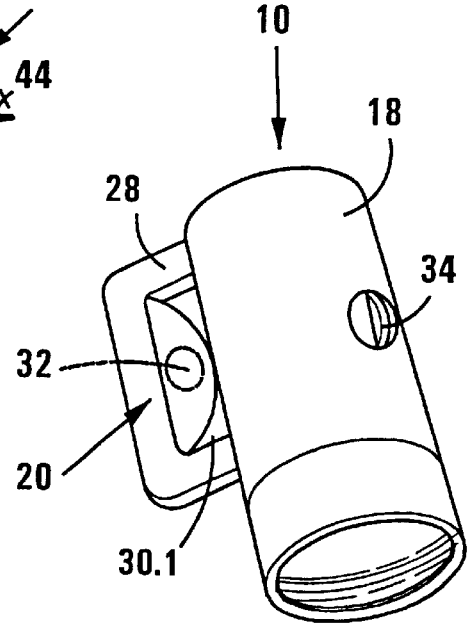
FIG. 3A shows an enlarged schematic three-dimensional detail view of the position indicating device shown in FIG. 3.
Figure 4:
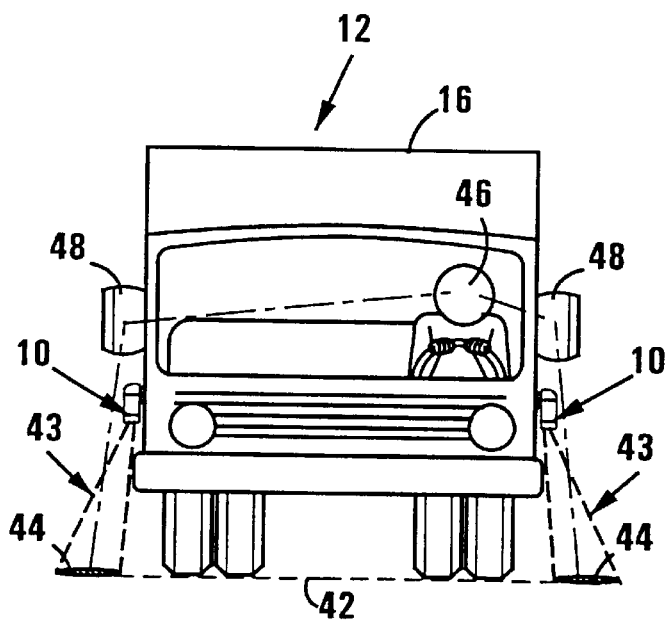
FIG. 4 shows a schematic front view of the vehicle of FIG. 1.
Figure 5:
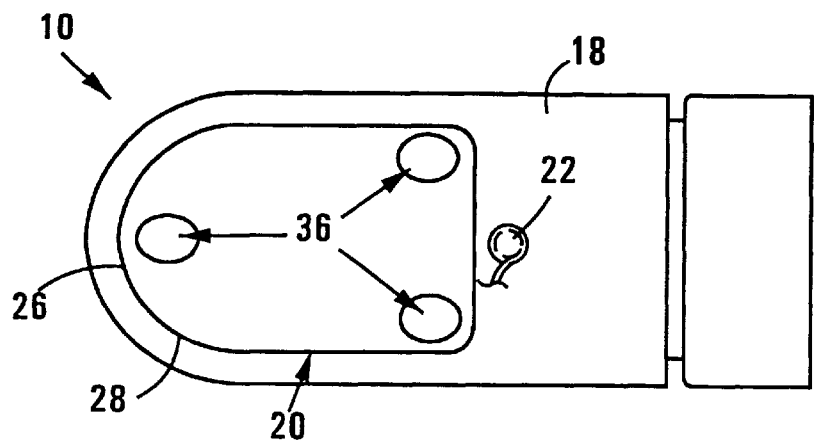
FIG. 5 shows a schematic bottom plan view of the position indicating device of FIG. 1.
Figure 6:
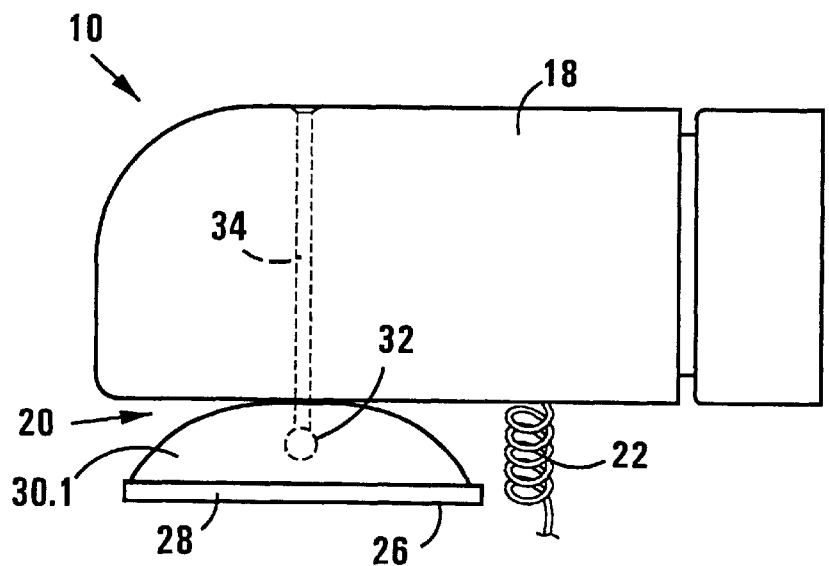
FIG. 6 shows a schematic side view of the position indicating device of FIG. 5.
Figure 7:
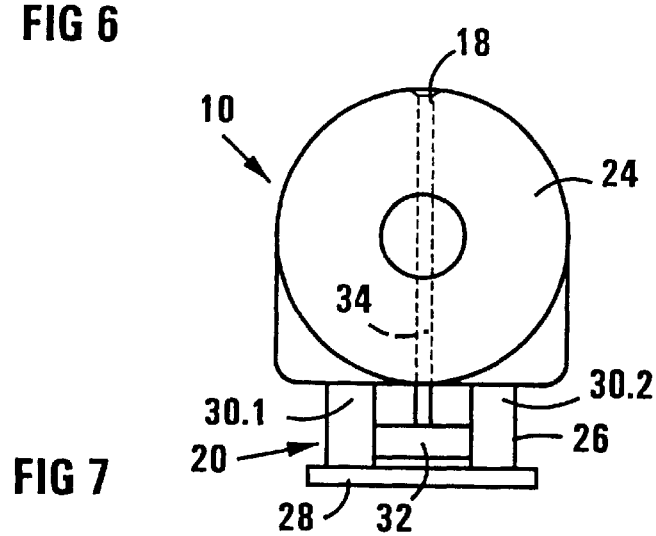
FIG. 7 indicates a schematic front end view of the position indicating device of FIG. 5.

A position indicating device in accordance with the invention, is designated generally by the reference numeral 10. With reference to FIGS. 1 to 7 of the drawings, the position indicating device 10 is mounted to a truck 12. The truck comprises a horse 14 and trailer 16, with a pair of position indicating devices 10 being mounted to the trailer 16 at a rear end 17 of the truck.

Each position indicating device 10 comprises an electric lamp 18 and an adjustable mounting arrangement designated generally by the reference numeral 20. The lamp 18 includes an electrical conductor 22 that is connectable to the truck's battery and a convergent lens 24 that is operable to emit a focused beam of light when the lamp is illuminated, in use.

The mounting arrangement 20 includes a mounting support comprising a base plate 28 and a pair of spaced parallel support members 30.1 and 30.2, a pivot pin 32 that extends between the support members 30.1 and 30.2 and an adjustment screw 34. The base plate 28 defines three apertures 36 in which fastening screws (not shown) are received for securing the base plate to the trailer 16. The upper sides of the support members 30.1 and 30.2 are convexly curved. The support members 30.1 and 30.2 each define sockets in inner sides thereof, that are disposed opposite one another and in which opposite end regions of the pivot pin 32 are rotatably received. The adjustment screw 34 defines an elongate shank that is received within a passage defined by the lamp 18, with an end region of the screw defining a screw-thread formation that is screw-threadingly engaged with the pivot pin 32. Hence, by loosening the adjustable screws 34, the position of the electric lamp can be altered by tilting the lamp with respect to the support members 30.1 and 30.2. When a desired position of the electric lamp relative to the base is achieved, the adjustment screw is then tightened thereby securing the electric lamp with respect to the support members. In this way, the angle of a beam of light emitted by the electric lamp with respect to the trailer 16, can be adjusted.

Each position indicating device 10 is secured to the rear end 17 of the trailer 16 near opposite corners of the trailer defined between the rear end and sides 40 thereof. In a particular embodiment, the position indicating devices are secured to the trailer at a height of approximately 1 meter above ground level 42. The position of the electric lamp is adjusted so as to produce a beam of light that is directed downwardly onto a ground surface 42 to form a spot 44 of light, on the ground. In particular, the position of the lamp 18 of each position indicating device 10, is adjusted with respect to the mounting support, so as to emit a beam of light at an angle $\alpha$ of approximately 45° with respect to the side 40 of the trailer 16. As such, the spot of light produced by the electric lamp is disposed an equal distance from the rear end 17 and the relevant side 40 of the trailer. The spot of light, by being spaced from the trailer, thus demarcates a safety clearance between the vehicle and the boundary of a confined area that the vehicle is to be manoeuvred in. The Applicant envisages that the convergent lens of the lamp will have refractive properties that will result in the spot of light having a diameter of approximately ten centimeters.

The Applicant envisages that the lamp will be positioned, in use, so as to produce a spot of light on the ground 42 approximately 30 centimeters from the rear end of the trailer and hence also a distance of approximately 30 centimeters from the side thereof. In use, the spots of light produced by the electric lamps of the position indicating devices, are visible to a driver 46 of the truck 12, via the truck's rear view mirrors 48. The driver's lines of sight to the spots of light, via the rear view mirrors 48, are indicated in FIGS. 1 to 4 of the drawings by means of broken lines. Thus, by observing the spots 44 of light when manoeuvring the truck 12 in a confined area, the driver of the vehicle will be able to judge the proximity of the spots of light and hence of the trailer 16 to the boundary of the confined area. Furthermore, the distance of the spots 44 of light from the sides 40 and the rear end 38 of the trailer 16 will be known to the driver and he will thus also be able to judge the distance of the sides and rear end of the trailer from the boundary of the confined area. It will thus be appreciated that the distance indicating devices will be of great assistance to a driver in manoeuvring the truck in a number of situations including reversing of the truck, approaching a loading platform, parking the truck, etc.

The Applicant envisages that for daytime use, the lens of the electric lamp may be coloured so as to produce a coloured beam of light which may be more noticeable during the day than that provided by a conventional transparent lens.

The distance indicating device 10 thus provides a relatively inexpensive device for assisting a driver of a vehicle in manoeuvring the vehicle in a confined area which may or may not be bounded by other objects. The distance indicating device 10 thus does not require the confined area to be bounded by relatively large objects so as to enable its operation.

The invention extends to a vehicle such as the truck 12 having a distance indicating device in accordance with the invention mounted thereon. The invention also extends to a method of indicating the position of a vehicle to the driver of the vehicle, as described hereinabove.

Figure 8:
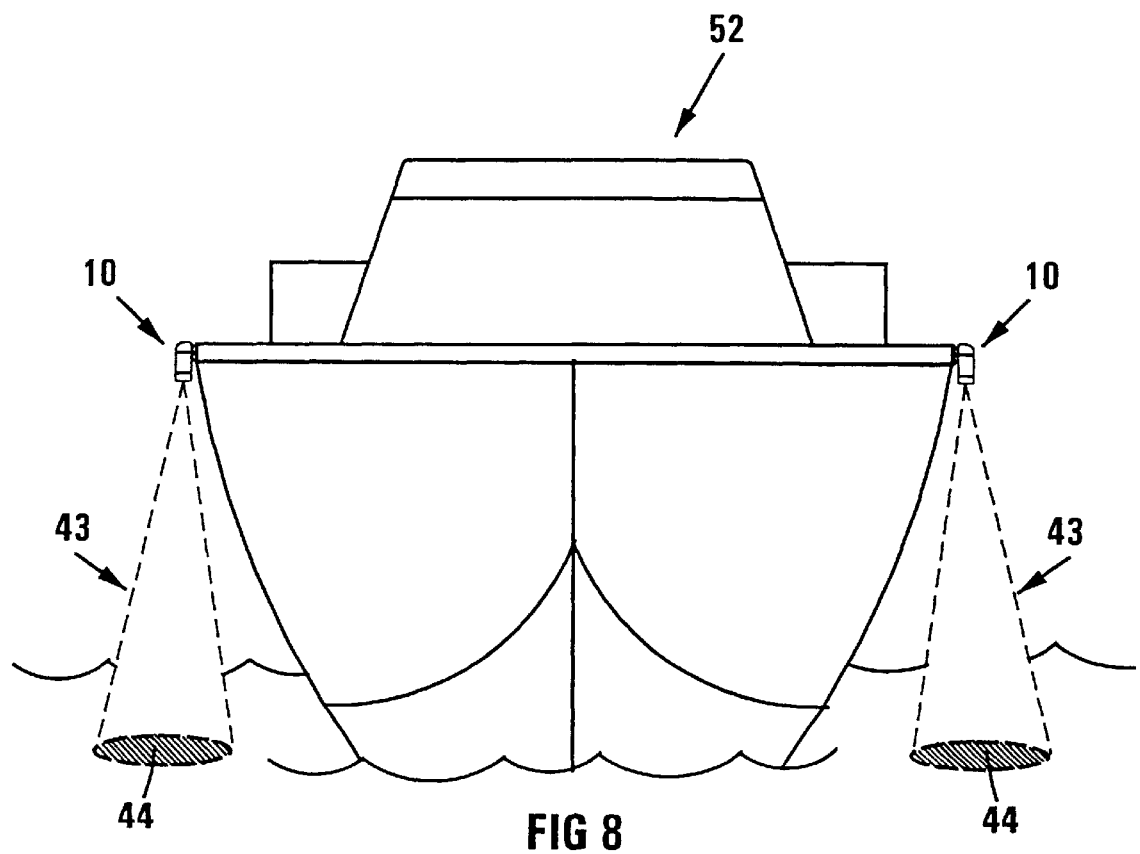
FIG. 8 shows a schematic front view of a boat having a position indicating device in accordance with the invention, mounted thereto.
Figure 9:
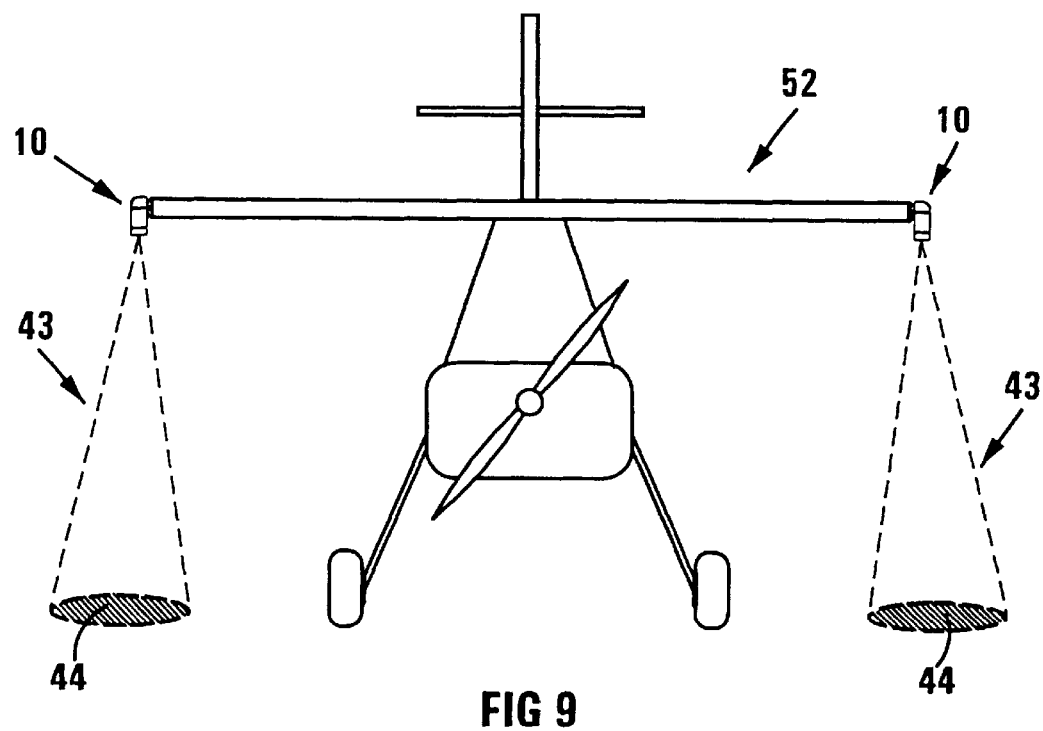
FIG. 9 shows a schematic front end view of a light aircraft having a position indicating device in accordance with the invention, mounted thereto.

With reference to FIGS. 8 and 9 of the drawings, it can be seen that the distance indicating device can be mounted to other vehicles such as a boat 50 and a light aircraft 52 for assisting the pilots in manoeuvring the vehicles in confined areas. In FIGS. 8 and 9 of the drawings the same reference numerals are used to indicate the same features as those depicted in FIGS. 1 to 7.

In the case of the boat 50, a position indicating device 10 is mounted to the boat at each of the port and starboard sides of the boat near the deck of the boat. The lamps of the devices 10 are directed downwardly onto the surrounding water surface to form a spot 44 of light that can be observed by the pilot for assisting in manoeuvring the boat in a confined area. In the case of the light aircraft 52, a position indicating device 10 is mounted to the ends of the wings of the aircraft, with the lamps of the devices being directed downwardly onto a runway so as to form spots 44 of light on the runway. In this application, the Applicant envisages that in addition to indicating the position of the aircraft relative to the boundaries of a confined area, the spots of light will also indicate to the pilot of the aircraft, the height of the aircraft relative to the runway. This can be achieved as the pilot will be aware of the diameter of the spot of light when the aircraft is grounded. As such, when the aircraft is in the air, the diameter of the spot will be relatively larger. Thus, the pilot will be able to judge the proximity of the aircraft to the runway by the size of the spot of light on the runway.

What is claimed as new and desired to be protected by Letters Patent is set forth in the appended claims:

1. A vehicle position indication system that can be mounted to a vehicle, the vehicle position indicating device comprising
   (a) a first side postion indicating device including
      (i) a first electric lamp that is operable to emit a first focused beam of light when the first lamp is illuminated; and
      (ii) a first mounting means for mounting the first lamp to a first side of the vehicle in an arrangement wherein the first beam of light produced by the first lamp is directed downwardly onto a surrounding substrate surface, in use, thereby to form a first spot of light on the substrate surface at a predetermined distance from the first side of the vehicle, that can be observed by a driver of the vehicle, to allow the driver to judge the proximity of the first spot of light and hence of the first side of the vehicle to the boundary of a confined area; and (b) a second side postion indicating device including
  (i) a second electric lamp that is operable to emit a second focused beam of light when the second lamp is illuminated; and
  (ii) a second mounting means for mounting the second lamp to a second side of the vehicle in an arrangement wherein the second beam of light produced by the second lamp is directed downwardly onto a surrounding substrate surface, in use, thereby to form a second spot of light on the substrate surface at a predetermined distance from the second side of the vehicle, that can be observed by a driver of the vehicle, to allow the driver to judge the proximity of the second spot of light and hence of second side of the vehicle to the boundary of a confined area, whereby the driver can judge the proximity of the vehicle to the boundaries when manoeuvring the vehicle in the confined area;

wherein the first side is a driver side and the second side is the passenger side, wherein the first mounting means is disposed on the rear driver side corner of the vehicle to form the first spot of light on the substrate surface at the corner of the vehicle, to allow the driver to judge the proximity of the driver side, driver side back corner, and back side of the vehicle to the boundary of the confined area, and wherein the second mounting means is disposed on the rear passenger side corner of the vehicle to form the second spot of light on the substrate surface at the corner of the vehicle and at an angle of 45 degrees with respect to the rear and passenger side of the vehicle, to allow the driver to judge the proximity of the passenger side, passenger side back corner, and back side of the vehicle to the boundary of the confined area.

2. A tractor-trailer vehicle including a vehicle position indication system, the vehicle comprising a tractor; and a trailer, the trailer having the vehicle position indicating system disposed thereon, the vehicle postion indicating system including:

(a) a driver side position indicating device including:
  (i) a driver side electric lamp that is operable to emit a first focused beam of light when the driver side lamp is illuminated; and
  (ii) a driver side mounting means disposed on the rear driver side corner of the trailer for mounting the driver side lamp to the rear driver side corner of the vehicle in an arrangement wherein the first beam of light produced by the driver side electric lamp is directed downwardly onto a surrounding substrate surface, in use, thereby to form the first spot of light on the substrate surface at a predetermined distance from the corner of the vehicle and at an angle of 45 degrees with respect to the rear and driver side of the vehicle, that can be observed by a driver of the vehicle, to allow the driver to judge the proximity of the first spot of light and hence of the driver side, driver side back corner, and back side of the vehicle to the boundary of a confined area; and (b) a passenger side position indicating device including:
  (i) a passenger side electric lamp that is operable to emit a second focused beam of light when the passenger side lamp is illuminated; and
  (ii) a passenger side mounting means disposed on the rear passenger side corner of the trailer for mounting the driver side lamp to the rear passenger side corner of the vehicle in an arrangement wherein the second beam of light produced by the passenger side electric lamp is directed downwardly onto a surrounding substrate surface, in use, thereby to form the second spot of light on the substrate surface at a predetermined distance from the corner of the vehicle and at an angle of 45 degrees with respect to the rear and passenger side of the vehicle, that can be observed by a driver of the vehicle, to allow the driver to judge the proximity of the second spot of light and hence of the passenger side, driver side rear corner, and rear of the vehicle to the boundary of a confined area when manoeuvring the vehicle in the confined area, whereby the driver can judge the proximity of the vehicle to the boundaries when manoeuvring the vehicle in the confined area.

* * * * *